United States Patent Office 3,392,106
Patented July 9, 1968

3,392,106
HYDROCRACKING CATALYST COMPOSITIONS AND PROCESSES UTILIZING A CRYSTALLINE ALUMINOSILICATE PROMOTED WITH ZINC AND A GROUP VI–B METAL COMPOUND
Ralph Burgess Mason, Denham Springs, and Glen Porter Hamner, Baton Rouge, La., assignors to Esso Research and Engineering Company, a corporation of Delaware
No Drawing. Filed Mar. 29, 1966, Ser. No. 538,222
16 Claims. (Cl. 208—59)

ABSTRACT OF THE DISCLOSURE

The present disclosure relates to improved catalyst compositions comprising a combination of either a Group II–B and hydrogen or hydrogen precursor cations and a Group V–B or Group VI–B metal component on a crystalline aluminosilicate molecular sieve. In a preferred method of preparation the sieve is initially cation exchanged with the Group II–B ion and the Group V–B or Group VI–B component is introduced in a second step by impregnation process. For use in hydroselective processes it is desirable to utilize a small pore zeolite, e.g. a pore diameter in the range of 4 and 6 A. which has been ion exchanged with hydrogen or hydrogen precursor cation and has been treated with a Group VI–B metal. For use in hydrotreating, hydrocracking or disproportionation reactions, it is desired that the zeolite be ion exchanged with a Group II–B cation followed by treatment with a Group VI–B metal component. Preferred forms of such catalyst include zinc molybdate faujasite and zinc tungstate faujasite.

---

The present invention concerns improved catalyst compositions for use in petroleum conversion reactions. In particular, the present invention concerns non-noble metal catalysts which show unexpectedly high activity in petroleum hydrocarbon conversion reactions occurring in the presence of an added reducing gas, such as hydrogen. Even more specifically, the present invention relates to a catalyst composition comprising a crystalline metal alumino-silicate zeolite, having uniform pore openings between about 4 and 15 Angstrom units, which zeolite contains a mixture of metals consisting of a metal cation from Group II–B of the Periodic Table in conjunction with a metal or metal compound (such as the oxide, sulfide, etc.) from Group V–B or Group VI–B of the Periodic Table. The invention is further related to the methods of preparation of such catalyst compositions and petroleum conversion reactions employing such compositions.

There are many processes in the petroleum field which require a catalyst having a substantial hydrogenation-dehydrogenation activity. These processes include, for example, hydroforming, hydroisomerization, hydrotreating and hydrocracking, among others. In order to effectuate such reactions, the art has employed catalyst composites containing as an active hydrogenation-dehydrogenation component a metal or metal compound from Groups VI and VIII of the Periodic Table. The Group VI metals and metal compounds suffer from the disadvantage that as sole hydrogenation components they exhibit a relatively low order of activity in catalyzing petroleum hydrocarbon hydrogenation type reactions. Similarly, within the Group VIII metals and metal compounds, there is a wide order of catalyst activity. It is generally agreed that the platinum group metals of Group VIII, e.g. platinum, palladium and, to a lesser extent, nickel, exhibit substantially higher hydrogenation-dehydrogenation catalyst activity, as compared to the remaining metals and metal compounds in that group. Thus, the platinum group metals are generally considered the metals of choice for use in such reactions. However, the platinum group metals do suffer from a major disadvantage in that they are extremely expensive. It is evident that, if it were possible to substitute for these platinum group metals, metals of a substantially lower cost without a concomitant sacrifice in catalyst activity or selectivity, then substantial economic savings would be possible in the practice of the petroleum processes hereinbefore described.

It is, therefore, an object of the present invention to provide catalyst compositions comprising non-noble (platinum group) metal hydrogenation components, which catalyst compositions exhibit the same order of activity and selectivity toward petroleum hydrocarbon reactions as do the catalyst compositions incorporating the platinum group metals.

It is a further object of the present invention to provide methods for the preparation of such catalyst compositions and petroleum conversion processes where such catalyst compositions are found useful.

It has now been found that mixed non-noble metal modifications of crystalline alumino-silicate molecular sieves exhibit unexpectedly high catalytic activity and selectivity in petroleum hydrocarbon conversion reactions involving a substantial hydrogenation function. The metal modifications found to be effective in the practice of the present invention include, as a first component, a cation of the Group II–B metals of the Periodic Table (Handbook of Chemistry and Physics, 38th Edition, Chemical Rubber Publishing Company) or hydrogen and/or hydrogen precursor cations, e.g., ammonium ion. The ammonium ion exchanged form may be converted to the hydrogen form by calcining the exchanged sieve at 500 to 1000° F. for a period of from 1 to 10 hours. The second component of the mixed metal modification of the crystalline alumino-silicate molecular sieve zeolite is a metal or metal compound selected from Group V–B or Group VI–B of the Periodic Table. Preferred embodiments of the present invention include a mixed metal modification of a crystalline alumino-silicate molecular sieve, said metal modification comprising a Group II–B metal cation exchanged onto said sieve and a Group VI–B metal or metal compound deposited on said sieve by wet impregnation or other processes known to the art. Particularly preferred for use in the present invention include zinc and cadmium cations from Group II–B and molybdenum and tungsten as the oxides or sulfides from Group VI–B. Especially preferred metal modifications of crystalline aluminosilicate molecular sieves include the molybdenum-zinc, molybdenum-tungsten and tungsten-zinc modifications.

The desired mixed metal modifications of the crystalline alumino-silicate molecular sieves can be obtained by contacting the alkali or alkaline metal alumino-silicates, which is the usual original form of these materials as obtained from either the natural source or via the synthetic route, with aqueous solutions of water-soluble compounds of the desired metals. While it is possible in some instances to incorporate both desired components simultaneously by treating the molecular sieve with a solution containing both of the metals in a soluble form, the formation of insoluble precipitates in some preparations prevents simultaneous addition. Consequently, it is generally preferred to incorporate the Group II–B or hydrogen containing cations in an independent step by contacting the molecular sieve with the aqueous solutions of the Group II–B metal salts, e.g., the chlorides, nitrates, etc. of these metals with ammonium hydroxide, ammonium chloride, etc. or a mineral acid for the hydrogen cations. For example, in a preferred method of preparation, a crystalline alumino-silicate molecular sieve is cation exchanged with a Group II–B cation or with a hydrogen or hydrogen precursor cation. The resulting partially exchanged sieve is then contacted with either an ammoniacal or alkaline solution of the Group V–B or Group VI–B acidic oxides. In a particularly preferred embodiment, the Group II–B or hydrogen cation form of the molecular sieve is contacted with an ammonium polysulfide solution of the sulfides of the Group V–B or Group VI–B metals. As a less preferred embodiment, it is possible to incorporate the Group V–B or Group VI–B into the molecular sieve first, followed by cation exchange with the Group II–B or hydrogen cation containing solution.

It is desirable to introduce either Group II–B or the hydrogen precursor cation into the molecular sieve so as to replace 60 to 98%, preferably 70 to 95% of the alkali (sodium) ions originally present. Similarly, it is desirable that from about 3 to 25 wt. percent based on the molecular sieve of the Group V–B or Group VI–B metal anion be introduced into the molecular sieve, preferably from about 5 to 15 wt. percent. The alkali or alkaline metal content of the final mixed cation containing molecular sieve should be less than about 10 wt. percent, preferably less than 5 wt. percent.

Crystalline alumino-silicate zeolites, commonly referred to as "molecular sieves," are now well known in the art. They are characterized by their highly ordered crystalline structure and uniformly dimensioned pores, and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e., not adsorbed) by a particular sieve. A number of these zeolite materials are described, for example, in United States Patents 3,013,982–86 wherein they are characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes.

In general, the chemical formula of anhydrous crystalline alumino-silicate zeolites expressed in terms of moles may be generally represented as:

$$0.9 \pm 0.2 M_{2/n}O : Al_2O_3 : XSiO_2$$

wherein M is selected from the group consisting of hydrogen, monovalent and divalent metal cations and mixtures thereof; $n$ is its valence, and X is a number from about 1.5 to about 12, said value being dependent upon the particular type of zeolite. The zeolite as produced or found naturally normally contains an alkali metal such as sodium or an alkaline earth metal such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g., synthetic faujasite, mordenite, etc., will also have varying silica to alumina ratios depending upon such variables as composition of the crystallization mixture, reaction conditions, etc.

For use in hydrocarbon conversion processes, the higher silica to alumina zeolites will be preferred because of their higher stability at elevated temperature. Therefore, whereas the present invention contemplates the use of zeolites in general, those having silica to alumina mole ratios above about 3 will be preferred. Typical among these is the synthetic faujasite variety, wherein X in the above formula is about 3 to 7, preferably 3 to 6, most preferably 4 to 5.5, and the synthetic mordenite variety, wherein X is about 8 to 12, preferably 9.5 to 10.5. To be suitable as catalysts they should have uniform pore diameters of about 6 to about 15 Angstrom units, preferably 10 to 13 Angstrom units. A conventional scheme for preparing sodium synthetic faujasite is as follows:

Colloidal silica or silica hydrosol is mixed with a solution of sodium hydroxide and sodium aluminate at ambient temperature. Suitable reactant molar ratios are within the following ranges: $Na_2O/SiO_2$, 0.28 to 0.80; $SiO_2/Al_2O_3$, 7 to 40; $H_2O/Na_2O$, 20 to 60. In order to aid crystallization, the reaction mixture may be either digested at ambient temperature for up to 40 hours or more, e.g., 1 to 15 hours, or cooled to below about 100° F., after which it is heated to 180° to 250° F., e.g., 200° to 220° F., and held at said temperature for a sufficient period to crystallize the product and preferably to achieve maximum crystallinity, e.g., 24 to 200 hours or more, typically 50 to 100 hours. A crystalline hydrated sodium aluminosilicate zeolite having a faujasite structure is then separated from the aqueous mother liquor by decantation or filtration and washed to recover a crystalline product. After additional modification by cationic exchange and metal anion deposition as hereinafter described, it is calcined at temperatures up to about 1000° F. in order to remove the water of hydration.

As mentioned, the above procedure is utilized for the production of zeolites having the synthetic faujasite structure utilizing appropriate reactant mole ratios as described, for example, in United States Patent Numbers 2,882,244 and 3,013,988. By alteration of the reactant mole ratios, it may also be used for the preparation of zeolites having less preferred silica to alumina mole ratios of about 2.0. This type of zeolite is described, for example, in United States Patent Number 2,882,243 and designated therein as "Zeolite A." A somewhat altered procedure, performed at elevated temperature and pressure, may be used to produce zeolites having the synthetic mordenite structure as described, for example, in the Journal of the Chemical Society (1948), pp. 2158–2163.

The above-described crystalline zeolites have recently gained wide acceptance as catalysts and catalyst supports for hydrocarbon conversion processes, e.g., catalytic cracking, hydrocracking, etc. This has proven particularly true of the synthetic faujasite type of zeolite.

When utilizing comparatively large pore, i.e., 6 to 15 Angstrom units, molecular sieves, it is preferred that the mixed metal form of the molecular sieve be derived from mixtures of the Group V–B or Group VI–B and Group II–B metals. Such mixed metal wide-pore form molecular sieves are utilized in petroleum conversion reactions, such as hydrocracking, hydroisomerization, hydrodealkylation, hydrofining, hydrogenation, hydrocarbon disproportionation, etc.

On the other hand, when utilizing crystalline aluminosilicate zeolite materials, having uniform pore openings in the range from about 4 to less than about 6 Angstrom units, it is preferred that the zeolite contain a mixture of hydrogen ion and a metal or metal compounds selected from either Group V–B or VI–B of the Periodic Table. Such small-pore molecular sieve zeolite modifications are useful catalysts in hydroselective reactions, such as selective hydrocracking. Particularly preferred embodiments of small-pore molecular sieves include the hydrogen form of erionite to which has been added molybdenum or tungsten as the oxide or sulfide as the hydrogenation component. Useful small-pore catalyst compositions can also be prepared by utilizing a Group II–B cation exchanged small-pore molecular sieve, e.g., zinc or cadmium modifications, to which has been added molybdenum or tungsten in the anionic form. Particularly preferred embodiments of these small-pore molecular sieves include zinc zeolite A and zinc erionite, on which a molybdenum or tungsten compound, e.g., the oxide or sulfide, has been deposited.

The zeolite A, referred to above, fully described in U. S. Patent Number 2,882,243 and has a molar formula in the dehydrated form of:

$$1.0 \pm 0.2 M_{2/n}O : Al_2O_3 : 1.85 \pm 0.5 SiO_2$$

wherein M is a metal, usually sodium, and "$n$" is its valence. It may be prepared by heating a mixture containing $Na_2O$, $Al_2O_3$, $SiO_2$ and $H_2O$ (supplied by suitable source materials) at a temperature of about 100° C. for 15 minutes to 90 hours or longer. Suitable ratios of these reactants are fully described in the aforementioned patent. The zeolite produced by the aforesaid procedures will have uniform pore openings of about 4 Angstrom units as produced in the sodium form. It may then be converted to products having uniform pore openings of about 5 Angstrom units by replacing of sodium by conventional ion-exchange techniques with the Group II–B cations. The other preferred small-pore form of molecular sieve is the natural or synthetic form of erionite. The naturally occurring mineral erionite has elliptical pore openings of about 4.7 to 5.2 Angstrom units on its major axis. The synthetic form of erionite can be prepared by known methods, such as those disclosed in U.S. Patent Number 2,950,952. It is characterized by pore openings of approximately 5 Angstrom units and differs from the naturally occurring form in its potassium content and the absence of extraneous metals.

As an additional embodiment of the present invention, it has been found that the activity and effectiveness of the non-noble metal-containing moluecular sieves hereinabove described can be substantially improved by contact with sulfur or a sulfur-containing compound either prior to their use in petroleum hydrocarbon conversion processes or by conducting the conversion process in the presence of sulfur. The zeolite is preferably sulfactivated by contact either with sulfur-containing feed or, if the feed has a low sulfur content, with hydrogen sulfide or an added sulfur compound which is readily convertible to hydrogen sulfide at the conditions employed, e.g., carbon disulfide and the like. The extent of this sulfactivation treatment should be sufficient to incorporate about 0.5 to 15 wt. percent sulfur into the zeolite material.

The present invention may be more readily understood by reference to the following examples.

Example 1

A charge of 100 grams of molybdic acid was dissolved in 1000 grams of concentrated ammonium hydroxide solution at 100° F. and the solution was completed by stirring for 2 hours at 100° F. Thereupon, the solution was evaporated until faintly ammoniacal, reducing the weight to 523 grams. To this concentrate, 1000 grams of water were added and while stirring at room temperature, 500 grams of zinc faujasite prepared by zinc ion exchange of sodium faujasite, were added in small increments. The suspension was stirred for 24 hours at room temperature and then was filtered, dried, and pelleted for use. Of the original 500 grams zinc faujasite, 593 grams of dried material were recovered, which demonstrates a remarkable uptake of the molybdenum material. The final catalyst composition contained 9.9 wt. percent zinc and 12.7 wt. percent molybdenum trioxide. The faujasite used in this example had a silica to alumina mole ratio of 4.8/1. X-ray analysis of the product revealed that the catalyst, prior to calcination and/or sulfactivation, consisted in part of zinc molybdate hydrate. After heat treatment and sulfactivation the particles of zinc molybdate were too small to be detected by the X-ray technique. This small state of division and dispersion is highly desirable for hydrocarbon conversion reactions.

Example 2

The catalyst prepared in Example 1 was used with light catalytic cycle oil, first at 650° F. without sulfur activation and then at 700° F. with sulfur activation. The hydrocracking without added sulfur was not extensive but at 700° F. was essentially 100% to 430° F.— products. Accordingly, the temperature was reduced to 650° F. and operation was continued with 0.25 wt. percent carbon disulfide in the feed. Under these conditions about 60% of the feed was hydrocracked to 430° F.— products, which is comparable to the extent of hydrocracking obtained with the palladium hydrogen faujasite in another operation. Also, it was observed that at approximately the same degree of cracking the octane value of naphtha products from the non-noble metal catalyst were equal to or were somewhat higher than obtained with the palladium catalyst prepared for commercial use. Comparative data at about the same yield level are as follows:

HYDROCRACKING OF CATALYTIC CYCLE STOCK

| | Catalyst | |
|---|---|---|
| | 0.5% Palladium-Hydrogen Faujasite | Zinc Molybdate Faujasite of Example 1 |
| Operating Conditions: | | |
| Temperature, ° F | 612 | 650 |
| Feed Rate, v./v./hr | 2.4 | 1 |
| Pressure, p.s.i.g | 1,500 | 1,000 |
| Yield on Feed: | | |
| $C_3$ and Lighter, wt. percent | 3.3 | 2.8 |
| i-$C_4$, vol. percent | 10.3 | 6.6 |
| n-$C_4$, vol. percent | 5.7 | 3.2 |
| $C_5$–430° F., vol. percent | 55.3 | 58.1 |
| 430° F.+, vol. percent | 40.9 | 39.6 |
| Inspections on $C_5$–430° F. Naphtha: | | |
| RON +3 cc. TEL | 92 | 95.2 |
| MON +3 cc. TEL | 88 | 90.7 |

It is thus apparent that any inherent lower activity of the non-noble metal catalyst can be compensated by adjustment of the operating conditions without impairment to the quality of the naphtha product.

Example 3

The catalyst of Example 1 was employed in the fixed-bed, downflow hydrocracking of a heavy virgin naphtha at 650° F., 1 v./v./hr. and 1000 p.s.i.g. Its performance is compared below with hydroselective cracking catalyst containing palladium supported on zeolite A.

| | | Catalyst | |
|---|---|---|---|
| | Feed | Zinc Molybdate Faujasite | 0.5% Palladium-Zinc Zeolite A[1] |
| Operating Conditions: | | | |
| Feed Rate, v./v./hr | | 1 | 1 |
| Pressure, p.s.i.g | | 1,000 | 1,000 |
| Temperature, ° F | | 650 | 850 |
| Yields on Feed: | | | |
| $C_3$ and Lighter, wt. percent | | 4.6 | 8.8 |
| i-$C_4$, vol. percent | | 13.7 | 1.4 |
| n-$C_4$, vol. percent | | 4.0 | 5.4 |
| $C_5$+, vol. percent | 100 | 88.4 | 87.7 |
| $C_5$+ Inspections: | | | |
| RON +3 cc. TEL | 60.7 | 82.8 | 79.9 |
| MON +3 cc. TEL | 64.0 | 83.0 | 75.2 |
| Gravity, °API | 47.2 | 61.2 | 50.8 |
| ASTM Dist., ° F.: | | | |
| IBP | 330 | 94 | 100 |
| 5% | 332 | 120 | 130 |
| 10% | 336 | 140 | 205 |
| 20% | 340 | 178 | 287 |
| 50% | 356 | 272 | 340 |
| 80% | 387 | 336 | 366 |
| 90% | 400 | 361 | 382 |
| 95% | 423 | 390 | 440 |
| FBP | 440 | 408 | 454 |

[1] The zinc content of this catalyst was 21.0 wt. percent.

The superiority of the zinc molybdate faujasite is apparent from the standpoint of (1) yield, (2) octane number data, (3) production of lower boiling naphthas and (4) the more favorable isobutane yield. The latter while not included in the yield of $C_5+$ is of considerable advantage as alkylation feed stock.

Example 4

The catalyst of Example 1 is compared with a commercial 0.5 wt. percent palladium on hydrogen faujasite catalyst when processing heavy cracked naphtha feed. Data are as follows:

|  | Feed | Catalyst | |
|---|---|---|---|
|  |  | Molybdenum Zinc Faujasite | Palladium-Hydrogen Faujasite |
| Operating Conditions: |  |  |  |
| Feed Rate, v./v./hr | | 1 | 1 |
| Pressure, p.s.i.g | | 1,000 | 500 |
| Temperature, °F | | 680 | 560 |
| Yields on Feed: |  |  |  |
| $C_3$ and Lighter, wt. percent | | 3.0 | 1.7 |
| $C_4$, vol. percent | | ¹ 10.1 | 7.3 |
| $C_5$–430° F., vol. percent | 92.4 | 97.3 | 94.4 |
| 430° F.+, vol. percent | 7.6 | 3.8 | 4.6 |
| $C_5$–430° F. Inspections: |  |  |  |
| RON+3 cc. TEL | 87.2 | 90.0 | 88 |
| MON+3 cc. TEL | 77.8 | 89.2 | 80.6 |
| Sulfur, p.p.m | 1,150 | <20 |  |
| Bromine No | 27 | <1 |  |
| Vol. Percent Aromatics | 43 | 45 | 30 |
| MSA-OD | 0.89 | 0.05 |  |

| Feed | Catalyst | | |
|---|---|---|---|
|  |  | | Palladium-Hydrogen Faujasite |
|  |  |  | 1 |
|  |  |  | 1,500 |
|  |  |  | 700 |
|  |  |  |  |
|  |  |  | 11.0 |
|  |  |  | 38.0 |
|  |  |  | 76.0 |
|  |  |  | 0 |
|  |  |  |  |
|  |  |  | 94.4 |
|  |  |  | 92.6 |
|  |  |  |  |
|  |  |  |  |
|  |  |  | 13 |
|  |  |  |  |

¹ 6.5/3.6 ratio, $i = C_4/nC_4$.

From the standpoint of yield and octane number improvement the zinc molybdate faujasite is superior to the commercial palladium hydrogen faujasite catalyst. The degree of desulfurization and olefin saturation are added credits. The improvement in octane number with olefin saturation is an abnormal performance. Another noteworthy performance is the saturation of olefins without hydrogenation and cracking of aromatic constituents so that the latter goes through the process essentially unchanged. The MSA-OD test is a measure of the gum forming tendencies of a naphtha as determined by optical density measurement of a treated sample. The lower the value, the more stable is the naphtha. A typical regular grade gasoline blend should not exceed a level of 0.2 MSA-OD.

Example 5

The catalyst of Example 1 was further tested with light catalytic naphtha in a study of improvement of motor octane number. Yield and performance data are given below.

MOTOR OCTANE NUMBER IMPROVEMENT OF LIGHT CATALYTIC NAPHTHA BY MILD HYDROCRACKING WITH ZINC MOLYBDATE FAUJASITE CATALYST

|  | Feed |
|---|---|
| Operating Conditions: |  |
| Feed Rate, v./v./hr | 1 |
| Pressure, p.s.i.g | 1,000 |
| Temperature, °F | 670 |
| Gas Rate, $C+H_2$/bbl | 2,000 |
| Yields on Feed: |  |
| $C_3$ and Lighter, wt. percent | Trace 3.0 |
| i-$C_4$, vol. percent | 0.4 7.1 |
| n-$C_4$, vol. percent | 0.9 3.8 |
| $C_5+$, vol. percent | 98.7 90.5 |
| MON +3 cc. TEL | 86 92.9 |
| MSA-OD | 0.85 0.02 |

The 6.9Δ MON is a notable improvement and the yield loss is offset to a major extent with the 7.1 vol. percent yield of isobutane. Other assets are the motor cleanliness features reflected by the lower bromine number and the MSA-OD value. Since a major portion of the gasoline pool consists of catalytic naphtha, the outstanding reduction in MSA-OD obtained simultaneously with other improvements provides for greater flexibility in preparation of gasoline blends.

Example 6

The foregoing examples have demonstrated the excellent hydrocracking performance of zinc molybdate faujasite catalysts with a wide variety of feed stocks. This versatility and continued activity of the catalyst of Example 1 is demonstrated further in operation with a North Louisiana phenol extracted, 750 to 900° F. heavy gas oil. The results are:

HYDROCRACKING OF NORTH LOUISIANA PHENOL EXTRACTED 750–900° F. GAS OIL

[665° F., 1 v./v./hr., 1,000 p.s.i.g., 4,000 c.f./b. hydrogen rate]

| Fraction, °F. | $C_5$–320 | 320–725 | 725+ | $C_4$ |
|---|---|---|---|---|
| Vol. percent on Feed | ¹ 63.7 | 11.0 | 24.4 | ² 13.2 |
| Gravity, °API | 74.7 | 43.3 |  |  |
| RON, C1 | ³ 76.8 | 20 |  |  |
| RON +3 cc. TEL | ⁴ 94.4 | 22 |  |  |
| MON, C1 | 80.0 |  |  |  |
| MON +3 cc. TEL | 90.4 |  |  |  |

¹ 52.5 vol. percent $C_5$–250° F., 11.2 percent 250–320° F.
² 10.3 vol. percent i-$C_4$, 2.9 vol. percent n-$C_4$. 3.5 wt. percent $C_3$– gas on feed also produced.
³ Pour Pt., °F.
⁴ Cloud Pt., °F.

Approximately 75% conversion of the gas oil to components boiling lower than the feed was obtained with a naphtha yield which meets present motor pool specifications of 63.7 volume percent.

The foregoing examples show that a non-noble metal hydrocracking catalyst has been prepared which has performance features superior to some of those of palladium containing hydrocracking catalyst. The catalyst of the present invention is not sensitive to poisons as is demonstrated by performance with a wide variety of feeds under varying conditions. The activity of the catalyst is sufficient to provide hydrocracking at temperatures in the range of 550 to 750° F.

The preceding examples dealt with non-noble metal molecular sieve catalysts which have relatively large pore openings (about 13 Angstrom units). It is also possible to utilize non-noble metal molecular sieve catalysts having pore openings of less than 6 Angstrom units. Such catalysts are useful as hydroselective catalysts, that is, the normal or straight chain paraffin and olefin compounds are hydrocracked selectively to $C_4$ and lighter hydrocarbons (predominantly $C_3$ and $C_4$) leaving the high octane branched paraffins, naphthenes and aromatics unreacted. The operability of such catalysts is demonstrated in the following examples.

Example 7

A zinc tungsten molecular sieve catalyst was prepared by first ion exchanging the sodium form of zeolite A to form the zinc modification. The ion exchange was accomplished in three successive exchanges, each comprised contacting 500 grams of zeolite A with 2500 milliliters of a 15% solution of zinc chloride. The resulting three-fold zinc exchanged zeolite A by this technique has been found to have 21 wt. percent of zinc incorporated therein. This zinc zeolite A was composited with tungsten as per the following process. Ammonium tungstate was prepared by the addition of 100 grams of tungstic acid ($WO_3$) to 1000 grams of concentrated ammonium hydroxide while stirring with a magnetic stirrer at 100° F. This did not effect solution of the ammonium tungstate. The solution was evaporated by boiling until faintly ammoniacal. Thereupon, water was added in 500 gram increments to bring the total weight of water plus salt to about 3000 grams. This resulted in complete solution at 150° F. To this solution at 150° F., the wet cake containing about 500 grams of the zinc zeolite A was added in small increments with good stirring at 150° F., and upon removal of heat, agitation was continued for 24 hours. The treating liquor was removed by filtration and the cake was dried with no intervening water washes. The product analyzed 11.8 wt. percent tungsten.

The catalyst, after drying, was pelleted and was calcined for 35 hours at 950 to 1000° F. after first heating carefully to 300° F. and thereafter increasing the temperature at the rate of 100° F./hour in the 300 to 1000° F. range. The calcined catalyst was cooled and stored in a sealed bottle prior to use.

Example 8

The catalyst prepared in Example 7 was sulfactivated by operation with carbon disulfide in the feed and was used with Arabian $C_5$–$C_6$ feed under essentially the same conditions as employed with a sulfactivated palladium zinc zeolite A. Comparative data at both 850° C. and 750° C. showed that zinc tungstate catalyst to have about the same activity for conversion of normal paraffins and to produce the same amount of isoparaffins in the product at a given degree of conversion as exhibited by the palladium-zinc zeolite A catalyst. Data showing these features are:

HYDROSELECTIVE CRACKING OF ARABIAN $C_5$–$C_6$ NAPHTHA 0.5 v./v./hr., Ca 2000 cf./b. $H_2$ rate, 0.25 wt. percent $CS_2$ in feed

| | Feed | Catalyst | | | |
|---|---|---|---|---|---|
| | | Zinc Tungstate | Zeolite A | Zinc Pd | Zeolite A |
| Temperature, ° F | | 750 | 850 | 750 | 850 |
| Pressure, p.s.i.g | | 500 | 500 | 1,000 | 500 |
| Product Distribution, wt. percent; | | | | | |
| $C_3$– | 0.0 | 18.5 | 87.2 | 19.1 | 42.2 |
| i-$C_4$ | 0.0 | 0.8 | 1.8 | 0.9 | 2.2 |
| n-$C_4$ | 1.8 | 10.8 | 10.9 | 10.2 | 11.4 |
| i-$C_5$ | 14.1 | 12.7 | 11.3 | 14.3 | 11.5 |
| n-$C_5$ | 24.2 | 14.0 | 8.4 | 14.9 | 6.6 |
| 2,2 DMB | 0.6 | 0.3 | 0.3 | 0.3 | 0.3 |
| 2,3 DMB, 2 MP | 17.4 | 16.7 | 12.8 | 15.4 | 10.2 |
| CP, 3 MP | 12.9 | 12.4 | 10.6 | 12.0 | 9.6 |
| $NC_6$ | 22.9 | 8.8 | 3.5 | 8.1 | 1.3 |
| MCP | 3.3 | 3.0 | 2.6 | 2.9 | 2.6 |
| 3 MH | } 0.5 | 0.5 | 0.4 | 0.4 | 0.4 |
| CH | | | | | |
| Benzene | 1.9 | 1.5 | 1.2 | 1.5 | 1.7 |
| Conversion, n-$C_6$ | | 62 | 85 | 65 | 94 |
| Percent 2,3 DMB–2 MP Unreacted | | 96 | 74 | 88 | 59 |
| Percent CP–3 MP Unreacted | | 96 | 82 | 93 | 75 |

The above data can be evaluated by examination of the conversion of normal paraffins and the amount of branched paraffin remaining unreacted. Under the conditions requiring large conversion because of the high amount of normal paraffins in the feed, the zinc tungsten catalyst compares very favorably with the more expensive noble metal catalyst and if anything is even more selective. Thus, it could be used with feeds of lower normal paraffin content or at less severe conditions with the high n-paraffinic feeds and recycle of the $C_5+$ portion with improved results.

A further improved process utilizing the catalyst compositions of the present invention is to be found in a multiple-stage hydrocracking system particularly adapted to naphtha improvement. The first stage catalyst comprises the reaction product of a Group II–B or hydrogen-exchanged large pore zeolite with ammoniacal or alkaline solutions of a Group VI–B acidic oxide. The second stage catalyst may be either a small-pore mixed non-noble metal catalyst such as molybdenum or tungsten on a zinc zeolite A or zinc erionite, or, in the alternative, may consist of either of the two hydrogenation components described deposited on the hydrogen form of either zeolite A or erionite. It is also contemplated that the second stage catalyst might consist of a hydrogen form of a small-pore zeolite which has deposited thereon a platinum group metal as the hydrogenation component.

The two-stage hydrocracking system is necessary due to the fact that the hydrockate from the first-stage large-pore molecular sieve catalyst contains some unaltered straight chain paraffin hydrocarbons. This situation will generally be applicable when heavy naphthas are being used as the feed stock for the hydrocracking reaction. The multistage hydrocracking process for heavy naphtha and higher boiling feed stocks is illustrated by the following discussion.

The naphtha, gas oil, crude oil or even residua feed stocks, together with recycle portions, is fed to a first-stage reactor containing a non-noble mixed metal large-pore hydrocracking catalyst of the present invention. The temperature of the reactor is in the range between about 500 to 900° F. and the pressure is in the range between about 300 to 3000 p.s.i.g. The first stage hydrockate product is fractionated into either a 250° F.— and 250° F.+ fraction or when heavier feed stocks are used with concomitant incomplete conversion per pass, into 250° F.— light naphtha, 250° F.–650° F. heavy naphtha-heating oil fraction and 650°F.+ heavy gas oil fraction. The latter heavy gas oil fraction is recycled directly to the first-stage hydrocracking zone. The fraction containing the heavy naphtha and/or heating oil is passed to a selective hydrocracking zone containing a small pore zeolite catalyst, the treating temperature being in the range between about 650 to 900° F. and the pressure being in the range between about 300 to 3000 p.s.i.g., where the normal paraffins are removed primarily as $C_3$ and $C_4$ hydrocarbons. The liquid production from this operation is fractionated into naphtha fractions and a 430° F.+ bottoms. This 430° F.+ bottoms is recycled back to the first-stage hydrocracking zone. The naphtha portion or selected fraction thereof is combined with the 250° F.— fraction from the primary hydrocracking zone for production of enhanced yields of high octane number hydrockate products. Obviously, when the first-stage hydrocracker is operated to produce light naphtha exclusively or when the feed to the first-stage hydrocracking zone is a light naphtha, the recycle features outlined previously either are not employed or are altered drastically.

The operability of this process has been demonstrated by experiments outlined in Examples 9 and 10 following. A zinc molybdate faujasite catalyst is employed as the catalyst of preference in the first-stage hydrocracker, the catalyst being prepared by the method of Example 1. The second-stage small-port molecular sieve catalyst is preferably a palladium-zinc erionite containing 0.3 to 1.5 wt. percent palladium and 5 to 10 wt. percent zinc.

Example 9

The molybdenum zinc faujasite catalyst of Example 1 was activated by exposure to a hydrocracking operation at 700° F. and then at 650° F. with a light catalytic cycle oil feed stock containing 0.25 wt. percent sulfur. The activated catalyst was utilized to hydrocrack the heavy catalytic naphtha feed stock of Example 4. A portion of the total liquid hydrockate product was fractionated into a $C_5$–250° F. portion and a 250 to 430° F. portion. The latter was passed over the palladium-zinc erionite catalyst described above which had been sulfactivated by hydrocracking operation at 850° F. and 500 p.s.i.g. with Arabian $C_5$–$C_6$ light naphtha containing 1% of carbon disulfide. The liquid product from the selective hydrocracking or second-stage hydrocracker was combined with the segregated 250° F. portion for evaluation as a motor fuel. Yields are based on original feed and the results for a single-stage operation employing a commercial palladium hydrogen faujasite (0.5 wt. percent Pd) are compared below with the two-stage operation of this example.

hydrocracking operation utilizing the same catalysts described in Example 9 except that no distillation other than

HYDROCRACKING OF HEAVY CRACKED NAPHTHA

| | | Process | |
|---|---|---|---|
| | | Conventional Hydrocracking | Improved Hydrocracking |
| Catalyst | | Palladium Hydrogen Faujasite | Zinc Molybdate-Faujasite / Palladium Zinc Erionite |
| Catalyst Used in Stage | | 1 | 1 / 2 |
| Operating Conditions: | | | |
| Feed Rate, v./v./hr | | 1 | 1 / 0.5 |
| Pressure, p.s.i.g | | 1,500 | 1,000 / 500 |
| Temperature, °F | | 650 | 680 / 800 |
| | Feed | | Combined 2 Stage Prod. |
| Yields on Feed: | | | |
| $C_3-$, wt. percent | | 1.5 | 3 / 6.1 |
| $C_4$, vol. percent | | 6.0 | 10.1 / 11.1 |
| $C_5$–430° F., vol. percent | 92.4 | 88.5 | 97.3 / 90.5 |
| 430° F.+, vol. percent | 7.6 | 9.5 | 3.8 / 2.6 |
| $C_5$–430° F. Inspections: | | | |
| RON +3 cc. TEL | 87.2 | 87.0 | 90.0 / 97.0 |
| MON +3 cc. TEL | 77.8 | 83.0 | 85.0 / 90.2 |
| Sulfur, p.p.m | 1,150 | | 20 / 20 |
| Bromine No | 27 | | 1 / 1 |

The merits of the zinc molybdate faujasite as compared to the commercial noble metal catalyst have been pointed out in previous examples and are again made more evident by comparison of the more results. One of the outstanding features of the new catalysts of the present invention is the production of components contributing to motor octane number. Due to olefin saturation the increase in Research octane number between the two first-stage catalysts is not extremely large but the catalyst compositions of the present invention do produce a superior Research octane number as compared to conventional operations. Selectively hydrocracking out the normal paraffins results in a very substantial increase in Reserach octane number (an improvement of about 10, i.e., 87.2–97) and additionally yields a further increase in motor octane number (a total of about 12, i.e., 77.8–90.2). The improvement in octane number obtained by the two-stage process does not result in a loss of material. Rather, the over-all yield from the combined two-stage process of the desirable $C_5$–430° F. fraction is even higher than the yield obtained from the one-stage conventional hydrocracking process (90.5% versus 88.5%). It should be noted that the increase in octane number for the combined two-stage process compares to values of 0 and 5, respectively, obtained from a single-stage process employing the commercial catalyst. The octane number improvements for the process of the present invention at the yield levels obtained must be considered an outstanding performance.

Example 10

A light catalytic naphtha was employed in a two-stage stabilization was employed between the stages. The data are tabulated as follows:

TWO-STAGE HYDROCRACKING OF LIGHT CATALYTIC NAPHTHA FOR IMPROVEMENT AS MOTOR FUEL

| | | Catalyst | |
|---|---|---|---|
| | | Zinc Molybdate Faujasite | Palladium Zinc Erionite |
| Stage | | 1 | 2 |
| Operating Conditions: | | | |
| Feed Rate, v./v./hr | | 1.0 | 1.0 |
| Pressure, p.s.i.g | | 1,000 | 500 |
| Temperature, °F | | 685 | 800 |
| | Feed | | |
| Yields on Feed: | | | |
| $C_3$ and Lighter, wt. Percent | Trace | 3.7 | 8.4 |
| i-$C_4$, vol. Percent | 0.4 | 7.1 | 9.3 |
| n-$C_4$, vol. Percent | 0.9 | 2.0 | 4.3 |
| $C_5+$, vol. Percent | 98.7 | 92.0 | 84.4 |
| $C_5+$ Inspections: | | | |
| RON +3 cc. TEL | 99 | 95.3 | 99.7 |
| MON +3 cc. TEL | 86 | 91.3 | 93.6 |
| Sulfur, p.p.m | 330 | 47 | |
| Gravity, °API | 63.3 | 70.5 | 67.3 |
| MSA-O.D | 0.86 | 0.02 | 0.03 |

Again, the characteristic of the zinc molybdate-faujasite for improving motor octane number is apparent even when loss in Research octane number is sustained, presumably due to olefin saturation. Upon selectively hydrocracking the normal paraffins in stage 2, further increase in both Motor and Research octane number is obtained so that the overall net effect is 0.7 increase in Research octane number and 7.6 increase in Motor octane number while producing a more stable naphtha as measured by MAS-OD. This naphtha has a lower sulfur content. The improvement to catalytic naphtha is a big boost to the quality of the gasoline in the motor pool because of the sizeable contribution by catalytic naphtha. The reduced sulfur and improved motor cleanliness features permit greater flexibility in blending for the motor pool.

It has further been found that the non-noble metal catalyst comprising the reaction product of a Group II–B metal or hydrogen cation exchanged zeolite with either the ammoniacal or alkaline solution of a Group V–B or Group VI–B acidic oxides have the singular property of hydroconverting naphtha factions to lower molecular weight naphthas without hydrocracking the 6 carbon aromatic nucleus and simultaneously cause only a minimum of $C_4$ and lighter gas make. This unique feature of hydroaltering paraffins and naphthenes while leaving 6 carbon aromatic rings unaltered affords a method of obtaining high octane, lead-free motor fuel which is very attractive economically.

This unique process is adapted to naphtha improvement and naphtha factions are involved in the subsequent stages of the operation, but the feed to the initial stage may be a gas oil, crude oil or even residua fractions. In brief, this process embodiment consists in hydrotreating at a temperature in the range between 500 and 900° F., a pressure in a range between 300 to 3000 p.s.i.g. and a hydrogen rate of 1000 to 15,000 s.c.f./b. with one of the non-noble (mixed) metal molecular sieve catalysts of the present invention of which zinc molybdate faujasite is an example, followed by fractionation into $C_4$ and lighter, $C_5$–160° F., 160–430° F. and 430° F.+ bottoms fractions. The latter fraction is recycled to the primary hydrotreating zone. The $C_5$–160° F. fraction is utilized as a light naphtha component and the 160–430° F. fraction is extracted with a suitable solvent such as phenol, sulfur dioxide, glycols, lactones and other recognized solvents for aromatic recovery. This provides a nonaromatic raffinate containing paraffin and naphthene compounds and an aromatic extract which, upon solvent removal, leaves the high octane number aromatic portions of the naphtha. The same type separation may be effected by extractive distillations. The cut point of the feed to extraction is optional and heavier portions of the naphtha, e.g., the 250–430° F. fraction, may be employed.

The raffinate or fractions thereof is passed to either a combination of hydroselective cracking and powerforming or to one of these naphtha improvement processes, depending upon the type of hydrocarbons present. An alternate and/or supplemenal process is the recycle of the reffinate back to the hydrotreating zone. The operability of this process embodiment has been demonstrated as will be seen from the data contained in Example 11.

Example 11

A heavy naphtha blend comprising 60% of heavy catalytic naphtha, 25% coker naphtha and 15% steam cracked naphtha was hydrotreated at 650° F., 1000 p.s.i.g., 1 v./v./hr. and 4000 c.f./b. hydrogen utilizing the zinc molybdate faujasite of Example 1 as the catalyst. The hydrotreatate was then fractionated into $C_5$–250° F. naphtha and 250–430° F. naphtha fractions. The latter, which does not include benzene and toluene, was extracted three times at room temperature using butyrolactone as the solvent. The solvent compositions and ratio of solvent to hydrocarbon are as follows:

| Extraction | Solvent | | Ratio Solvent/Hydrocarbon |
|---|---|---|---|
| | Wt. Percent Butyrolactone | Wt. Percent Water | |
| 1 | 93 | 7 | 2/1 |
| 2 | 89 | 11 | 2.5/1 |
| 3 | 89 | 11 | 3/1 |

| Product Inspections | Aromatic Extract | Raffinate |
|---|---|---|
| Vol. percent on Feed | 46.7 | 53.3 |
| Gravity, °API | 35.1 | 52.2 |
| Octane Data: | | |
| RON | [1] 100.4 | [2] 68 |
| MON | [1] 89.2 | |
| Sulfur, p.p.m. | 8 | |

[1] Clear. [2] +3 cc. TEL.

The production of a sizeable portion of the aromatic extract, which on total extraction feed basis amounts to about 45 vol. percent, is a remarkable accomplishment. Even more significant is the production of 100 Research octane product (unleaded) in the 250 to 430° F. range, which provides a gasoline blend component that has not been produced by any other known process. The outstanding quality of this low pressure vapor blend component permits a maximum utilization of low value butane component when blending to a balanced vapor pressure motor gasoline. Also, it is to be remembered that this high octane, low volatility blended component is obtained from feed stocks not amenable to conventional refining operations.

The remarkable improvement in this low quality naphtha by the dual stage non-noble metal hydrocracking with extraction is illustrated by yield and octane number data on (1) the $C_5$–250° F., (2) the 250–430° F. extract fraction, and (3) the $C_5$–375° F. potentially available from hydrocracking the raffinate with either a zinc tungstate-zeolite A prepared according to the procedures of Example 7 or a zinc molybdate-faujasite prepared according to the procedures of Example 1. In stage II recycle of the 375° F.+ fraction to extinction is envisioned. The comparison is as follows:

| Stage | I | II [1] |
|---|---|---|
| Catalyst | Zn Molybdate-Faujasite | Zn Tungstate-Zeolite A |
| Feed | Heavy Catalytic Naphtha | 250–430° F. Raffinate, Stage I |
| Temperature, °F | 650 | 800 |
| Pressure, p.s.i.g. | 1,000 | 1,000 |
| Feed Rate, v./v./hr | 1.0 | 0.5 |
| Exit Hydrogen Rate s.c.f./b | 4,000 | 2,000 |

| Naphtha Fraction Inspected | Feed | $C_5$–250 | 250–430° F. ext. | $C_5$–375 |
|---|---|---|---|---|
| $C_5$–430° F. Yield, Based on Original Naphtha | 92.5 | 38 | 26 | 27 |
| Gravity, °API | 38.4 | 69.4 | 35.1 | 64 |
| RON, Clear | 72.5 | | 100.4 | |
| RON +3 cc. TEL | 87.2 | 100 | | 90 |
| MON Clear | 67.0 | | 89.2 | |
| MON +3 cc. TEL | 77.8 | 95.6 | | 85 |

[1] Extrapolated results based on catalyst performance with other feed stocks.

| | |
|---|---|
| Stage | [1] II |
| Catalyst | (2) |
| Feed | (3) |
| Temperature, °F. | 650 |
| Pressures, p.s.i.g. | 1000 |
| Feed rate, v./v./hr. | 1.0 |
| Exit Hydrogen Rate, s.c.f./b. | 2000 |
| Naphtha Fraction Inspected | $C_5$–375 |
| $C_5$–430° F. yield based on original naphtha | 27 |
| Gravity, °API | 70 |
| RON, clear | ------ |
| RON +3 cc. TEL | 99 |
| MON clear | ------ |
| MON +3 cc. TEL | 94 |

[1] Extrapolated results based on catalyst performance with other feed stocks.
[2] Zinc molybdate-faujasite.
[3] 250–430° F. raffinate, stage I.

Thus, naphtha fractions of vastly improved octane number at about the same over-all yield (91 versus 92.5) are obtained from the two-stage system employing non-noble metal hydrocracking catalysts. Similar results also are feasible upon either recycling the nonaromatic raffinate to hydrocracking with the wide-pore non-noble metal zeolite or passing to stage II containing the similar wide-pore zeolite operating at a different temperature level as compared to stage I.

It is further contemplated that the small-pore hydroselective cracking molecular sieve catalyst described previously will also find use in the lowering of pour points in heavy fuels. The lowering of such pour points in heavy fuels is desired because it will thereby eliminate the need for providing separate heating facilities to keep the fuel in a liquefied state. The improvement in fuel oil quality results from the removal of waxes by the hydroselective cracking of such fuel oils with a small-pore molecular sieve which has been exchanged with a cadmium or zinc cation and which additionally comprises a hydrogenation component selected from the Group V–B and Group VI–B metals and metal compounds. Useful hydroselective catalysts may also be prepared by ammonium ion exchange of the small-pore molecular sieve, followed by calcination to the hydrogen form of the sieve. The resulting hydrogen form is then treated with the hydrogenation component to form the desired catalyst compositions, e.g., molybdenum hydrogen erionite, tungsten hydrogen erionite and the like. Hydroselective cracking of heavy fuels can reduce the pour points from as high as 100° F. to a value of about −30° F.

The efficacy of a zinc molybdate form of mordenite as a catalyst in hydroisomerization, hydroalkylation and disproportionation reactions is shown by the following example.

Example 12

A charge of 100 grams of molybdic acid was dissolved in 1000 grams of concentrated ammonium hydroxide solution at 100° F. and the solution was completed by stirring for 2 hours at 100° F. Thereupon, the solution was evaporated until faintly ammoniacal, reducing the weight to 523 grams. To this concentrate, 1000 grams of water were added and, while stirring at room temperature, 500 grams of zinc mordenite prepared by zinc ion exchange of sodium mordenite were added in small increments. The suspension was stirred for 24 hours at room temperature and then was filtered, dried and pelleted for use. The final catalyst composition contained 4.3 wt. percent zinc and 6.4 wt. percent molybdenum trioxide.

The zinc molybdate mordenite catalyst was then tested for catalytic activity utilizing methylcyclopentane (99.5+percent pure) as the feed stock. In order to obtain an active form of the catalyst, it was sulfided by exposure at elevated temperatures to a $C_5/C_6$ feed containing from 0.25 to 1% $CS_2$. The catalyst can also be sulfactivated by including a sulfur-containing compound in the methylcyclopentane feed stream for the desired period of time until the catalyst has become sulfided.

The test was run at a temperature of 850° F., a space velocity of 0.55 v./v./hr., a hydrogen flow rate of 2220 c.f./b. and a pressure of 500 p.s.i.g. The resulting product was analyzed by gas chromatography which indicated that there was a 47% conversion of the methylcyclopentane feed stream. Product analysis of the converted material gives the following distribution (percentages are given based on the total product stream including the unconverted portion):

| Product: | Quantity, percent |
|---|---|
| Aromatics | 10.3 |
| Benzene | 0.7 |
| Toluene | 2.1 |
| Ethylbenzene | 0.6 |
| M and P xylenes | 2.5 |
| O xylene | 0.8 |
| Methyl ethylbenzenes | 1.7 |
| Trimethylbenzene | 1.9 |
| Cyclohexanes | 4.9 |
| Cyclohexane | 4.2 |
| Methylcyclohexanes | 0.7 |
| Paraffins | 26.7 |
| $C_3^-$ | 8.2 |
| i-$C_4$ | 4.1 |
| n-$C_4$ | 1.1 |
| i-$C_5$ | 5.0 |
| n-$C_5$ | 1.3 |
| 2,2-dimethylbutane | 0.2 |
| 2-methylpentane | 3.3 |
| 3-methylpentane | 2.5 |
| n-$C_6$ | 1.0 |
| Polymethylcyclopentanes | 5.1 |

The hydroisomerization activity of the zinc molybdate mordenite is shown by the production of a substantial amount of paraffin and further by the production of the $C_6$ cyclic compounds. Hydroalkylation disproportionation activity of the catalyst is evidenced by the aromatics, polymethyl aromatics and polymethylcycloparaffins produced by the reaction.

While the activity of the zinc molybdate mordenite catalyst has been shown for a methylcyclopentane feed, such activity is exhibited as well when other feed stocks are utilized. For example, a toluene-containing feed contacted with the zinc-molybdate mordenite catalyst of this example at the same general conversion conditions is disproportionated at high conversion levels to benzene and xylene.

What is claimed is:

1. A crystalline alumino-silicate having uniform pore openings between about 4 and 15 Angstrom units and having associated with said crystalline alumino-silicate both a zinc cation and a hydrogenation component consisting of oxides of metals, sulfides of metals and metals of Group VI–B of the Periodic Table.

2. The crystalline alumino-silicate of claim 1 wherein said crystalline alumino-silicate is associated with both a zinc cation and a metal compound from Group VI–B and said crystalline alumino-silicate is further characterized by having uniform pore openings between about 4 and 6 Angstrom units.

3. The crystalline alumino-silicate of claim 1 wherein said Group II–B cation is zinc and said Group VI–B metal is molybdenum.

4. The crystalline alumino-silicate of claim 3 wherein said zinc and said molybdenum are present substantially in the form of a chemical compound of both said metals.

5. The crystalline alumino-silicate of claim 3 wherein said crystalline alumino-silicate is further distinguished in having a silica to alumino mole ratio greater than 3 and wherein further said crystalline alumino-silicate has been ion exchanged so as to reduce its sodium content to below about 5.0% by weight.

6. An improved hydrocracking process comprising contacting a petroleum feed stock at hydrocracking conditions with a crystalline alumino-silicate associated with both zinc cations and a catalytically active molybdenum compound, said crystalline alumino-silicate being further characterized in having a silica to alumina mole ratio greater than 3 and a sodium content reduced to below 5.0% by cation exchange.

7. The improved hydrocracking process of claim 6 wherein said catalyst composition has been sulfactivated by contacting said catalyst composition with a sulfur-containing compound for a period of time prior to the completion of said hydrocracking reaction.

8. An improved two-stage hydrocracking process comprising as a first stage contacting a petroleum hydrocarbon feed stream at hydrocracking conditions with a catalyst composition comprising a zinc cation modification of a crystalline alumino-silicate zeolite, said zeolite being characterized in having a silica to alumina mole ratio greater than 3 and further having uniform pore diameter in the range from about 6 to about 15 Angstrom units, said zeolite being associated with a hydrogenation component comprising a catalytically active compound of the Group VI–B metals of the Periodic Table, and the second stage of said hydrocracking process comprising contacting at least a portion of the product of said first stage at hydroselective hydrocracking conditions with a catalyst composition comprising a crystalline aluminosilicate zeolite having uniform pore diameters in the range from about 4 to about 6 Angstrom units, said alumino-silicate zeolite being further characterized in having a hydrogenation component associated therewith.

9. An improved method of converting petroleum naphtha fractions to lower molecular weight naphthas without concomitant hydrocracking of $C_6$ aromatic nuclei contained in said fractions and yielding a minimum quantity of $C_4$ and lighter gases which comprises contacting a petroleum naphtha fraction containing a substantial amount of $C_6$ aromatic nuclei at hydrotreating conditions with a catalyst composition comprising a crystalline alumino-silicate zeolite having uniform pore diameters in the range from about 6 to 15 Angstrom units, said crystalline alumino-silicate having been cation exchanged with zinc cation so as to lower its sodium content to below about 5.0 wt. percent and wherein the said exchanged crystalline alumino-silicate zeolite is associated with a hydrogenation component consisting of a catalytically active compound of a Group VI–B metal.

10. The process of claim 9 wherein said catalyst composition comprises a zinc molybdate faujasite.

11. A process for producing gasoline blend components of very superior unleaded octane number levels from a heavy naphtha feed stock comprising contacting said naphtha feed at hydrotreating conditions with a catalyst composition comprising a zinc cation modification of a crystalline alumino-silicate zeolite, said zeolite being characterized in having a silica to alumina mole ratio greater than 3 and further having uniform pore diameters in the range from about 6 to about 15 Angstrom units, said zeolite being associated with a hydrogenation component comprising a catalytically active compound of the Group VI–B metals of the Periodic Table; fractionating the hydrotreated product and recovering a 250–430° F. fraction therefrom; extracting the 250–430° F. fraction with an aromatic recovery solvent to yield an aromatic rich extract in the solvent and a raffinate; and recovering the aromatic rich high octane extract from said solvent.

12. The process of claim 11 wherein the 250–430° F. raffinate fraction is further improved in octane number by contacting said material at hydrocracking conditions with a catalyst composition comprising a zinc cation modification of a crystalline alumino-silicate zeolite, having uniform pore diameters in the range from about 4 to about 15 Angstrom units, said zeolite being associated with a hydrogenation component comprising a catalytically active compound of the Group VI–B metals of the Periodic Table.

13. The process of claim 12 wherein said zeolite is zinc tungstate-zeolite A.

14. The process of claim 12 wherein said zeolite is zinc molybdate-faujasite.

15. An improved process for disproportionating a hydrocarbon feed stock comprising contacting said feed stock at disproportionating conditions with a catalyst composition comprising a zinc cation modification of a crystalline alumino-silicate zeolite, said zeolite being characterized in having a silica to alumina mole ratio greater than 3 and further having uniform pore diameters in the range from about 6 to about 15 Angstrom units, said zeolite being associated with a hydrogenation component comprising a catalytically active compound of the Group VI–B metals of the Periodic Table.

16. The process of claim 15 wherein said catalyst comprises zinc molybdate mordenite.

References Cited

UNITED STATES PATENTS

| | | | |
|---|---|---|---|
| 2,983,670 | 5/1961 | Seubold | 208—110 |
| 3,132,086 | 5/1964 | Kelley et al. | 208—57 |
| 3,236,761 | 2/1966 | Rabo et al. | 208—111 |
| 3,236,762 | 2/1966 | Rabo et al. | 208—111 |

DELBERT E. GANTZ, *Primary Examiner.*

ABRAHAM RIMENS, *Examiner.*